United States Patent
Harris

(10) Patent No.: US 8,643,705 B1
(45) Date of Patent: Feb. 4, 2014

(54) MULTILEVELED TELEVISION

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 996 days.

(21) Appl. No.: 12/723,661

(22) Filed: Mar. 14, 2010

(51) Int. Cl.
*H04N 13/00* (2006.01)
*H04N 13/04* (2006.01)

(52) U.S. Cl.
USPC ............................................. 348/51; 348/42

(58) Field of Classification Search
USPC ....................................... 348/42, 51
See application file for complete search history.

(56) References Cited

U.S. PATENT DOCUMENTS

| | | | |
|---|---|---|---|
| 6,590,605 B1 * | 7/2003 | Eichenlaub | 348/51 |
| 6,721,023 B1 * | 4/2004 | Weiss et al. | 349/87 |
| 6,999,071 B2 | 2/2006 | Balogh | |
| 7,221,332 B2 | 5/2007 | Miller et al. | |
| 7,564,182 B2 | 7/2009 | Boroson et al. | |
| 7,587,120 B2 | 9/2009 | Koo et al. | |
| 7,589,759 B1 | 9/2009 | Freeman et al. | |
| 7,659,660 B2 * | 2/2010 | Takahashi et al. | 313/506 |
| 7,663,218 B2 | 2/2010 | Bauer et al. | |

* cited by examiner

*Primary Examiner* — Geepy Pe
(74) *Attorney, Agent, or Firm* — Law Office of Scott C. Harris, Inc.

(57) ABSTRACT

A video or other kind of screen device form of multiple layers of pixels. The pixels in the different layers may be modified in order to form a 3-D effect. According to another embodiment, the lenses may be associated with different whalers of zoom in order to simulate a 3-D effect. The different layers may also be used as an additive with one another to reduce their output level. The different layers may also be used as backup layers, so that one layer can be used when another player fails.

6 Claims, 3 Drawing Sheets

MULTILEVELED TELEVISION

BACKGROUND

Modern video technology includes plasma, liquid crystal, and light emitting diodes. These have largely replaced cathode ray tube televisions. This technology makes it possible to provide a television which is much thinner and lighter than the old televisions.

Those having ordinary skill in the art conventionally have had the goal of making thinner and lighter television sets. Towards that goal, technologies have evolved to a point where the light emitting or light altering pixels can themselves be very thin.

SUMMARY

The present application takes advantage of this ability to make thin pixels therein, but in a new way. According to different embodiments are stacked into a stack. This produces the ability to make a number of different technologies, including three-dimensional ("3-D") effects.

DETAILED DESCRIPTION

Figure 1:
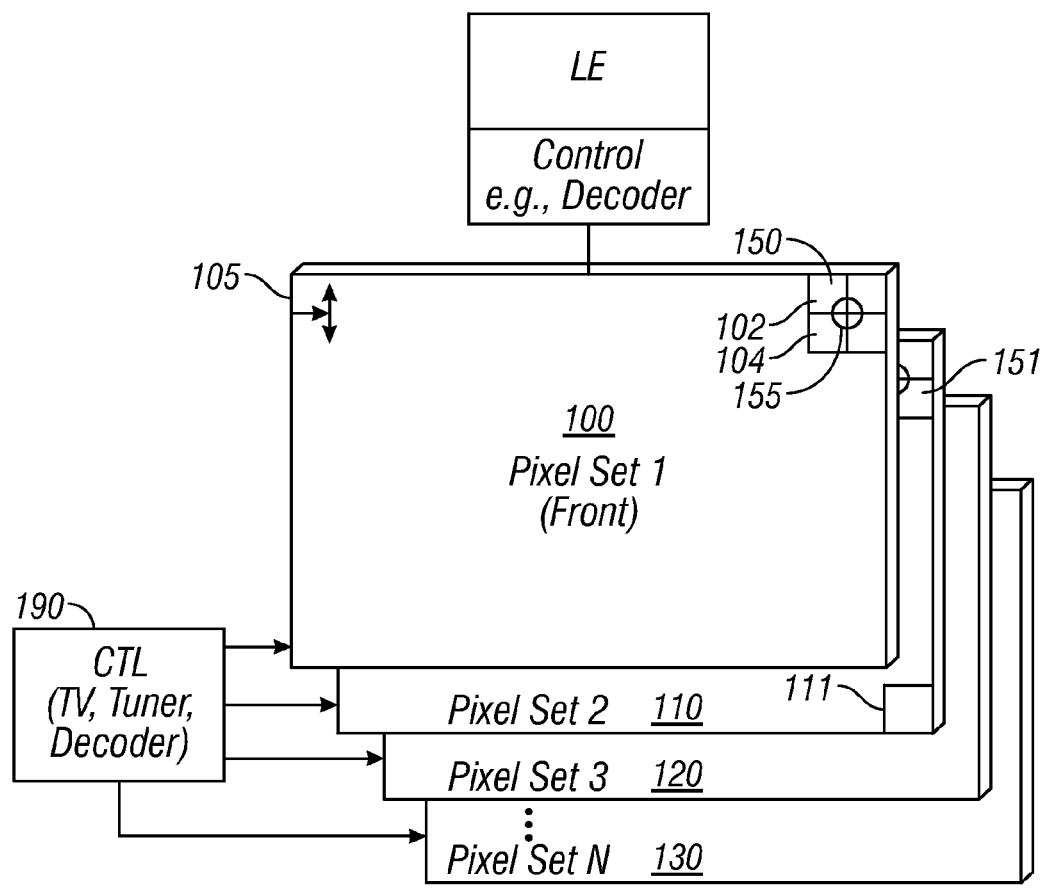
FIG. 1 shows a basic block diagram of one embodiment; in which a number of pixel sets occupy different levels on clear polymer substrates.

FIG. 1 shows an embodiment, in which a number of different pixels are arranged on sheets, each sheet forming a pixel set. The sheets form stacks which are on different planes relative to one another. While this refers to these as "planes" it should be understood that these planes need not be completely flat—for example, a plane can be uneven, rough or slightly curved.

For example, the front stack 100 is shown is pixel set number 1. In this embodiment, each stack may be formed of a number of pixels such as 102, 104 of light emitting materials. For example, an embodiment may use organic light emitting diodes on a transparent substrate. In this embodiment, light emitting elements are used, however in other embodiments, non-light emitting devices such as liquid crystal panels can be used with other light emitting elements. A typical OLed is formed from a plastic polymer. Other polymer technologies can be used in a similar way.

The pixel 100 includes all of the structure that would be necessary to play a single video. For example, pixel set one could be a television all on its own. A device may also include connections areas 105 and a controller 190. The controller 190 may include, for example, conventional television electronics including a television tuner, DVR and the like.

Other pixel sets are also provided in this embodiment. A pixel set 2 shown as 110 may provide another complete set of pixels, either directly against or slightly spaced from the pixel set 1. The pixel set_2 110 includes a plurality of pixels such as 111. In a similar way, there are other pixel sets in other stacked areas including pixel set_3 120 and pixel set_n 130. While this embodiment shows only for such pixel sets, it should be understood that there can be any number of such pixel sets. This embodiment may create a 3D effect by varying a distance perpendicular to a direction between pixels, that is, varying the distance in the direction perpendicular to the plane of the paper.

In one embodiment, the polymer holding the pixels can be polyvinylidene chloride (PVdC), with a thickness 0.01 mm thick (like plastic wrap). The layers may also have clear adhesive on the surface, to hold the different layers together. In one embodiment, for example, there can be 10 such layers.

The pixel sets receives output from the controller 109. The different pixel sets can be used in different ways.

Figure 2:
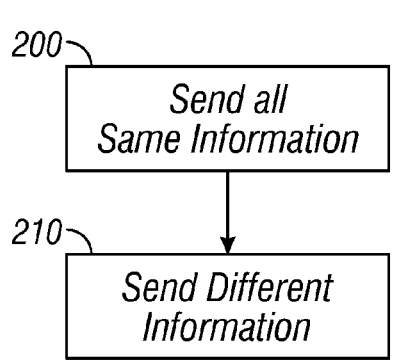
FIG. 2 shows the flowchart of information that allows operating this system.
Figure 3:
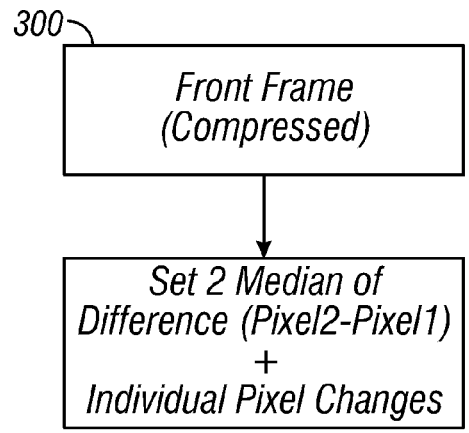
FIG. 3 shows a flowchart of the different information that is on the different pixels.

The control can be carried out according to FIG. 2. In a first embodiment, for example, the pixel sets can be sent all of the same information at 200. In the case of all being sent the same information, the pixels, if light emitting devices, will add their color and brightness so that the multiple layers together provides more brightness then it possible from a single layer.

In another mode shown as 210, each of a number of different layers may receive different information. This may be encoded as part of the television signal received by the controller 190, or alternatively can be created by the video processing structure. The receiving of different information for example can be such as to produce a 3-D effect since some of the frame portions will be at a different depth than other of the frame portions. In addition, the different layers may create interference with one another, leading to additional effects.

According to one embodiment, the signal received by the controller may be in a special compressed format. The front frame 300 may be received in a conventional compressed technique for example in MPEG-4 or in some other compressed video format. In addition, set 2 may be sent as the median of the difference between the pixel 2 minus the pixel 1. This could be, for example, a median value for the whole display, or a number of different median values for different areas on the display.

These different median values are then added to create a set to which is different than the original set, by the amount of the median value. In addition, individual pixel changes may be sent, but these individual pixel changes may be less because the median value will represent the median pixel. Since the median value is sent, many of the pixels will have no change at all. The sending of the median value ensures that the highest possible number of pixels will have no change at all.

The value zero can also be sent to represent no change. Another embodiment may operate in this way for pixel neighborhoods.

Figure 4:
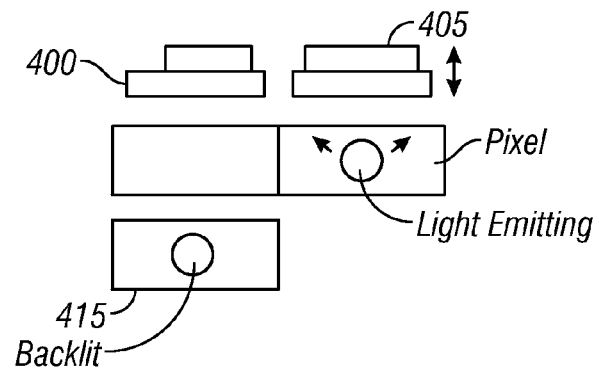
FIG. 4 shows an embodiment where lenses are unionist.

According to another embodiment, shown in FIG. 4, there can be an additional optical layer shown as 400. In this embodiment, the optical layer can be formed of zoom lenses 405 formed of micro-technologies such as Microelectromechanical systems or MEMS. The zoom lenses are movable between different levels of zoom. A zoom lens is a mechanical assembly of lens elements with the ability to vary its focal length. The zoom lenses may use, as conventional, two converging lenses, with a movable diverging lens between the other two lenses. The diverging lens is moved axially to change the focal length. The moving element may be micromachined to form an ultra small lens.

The lens can be small enough to cover a single pixel, or can be a larger lens that covers a neighborhood of pixels. The granularity of the 3D effect can be based on the size of the lens.

Each pixel or group of pixels may be modified in this way by the MEMS lenses. In addition, each pixel layer such as layer 1 may be individually associated with a set of MEMS lenses, so that for example pixel set 1 may have a first set of lenses, and pixel set 2 may have a different set of lenses in order to enhance the stereo effect.

As an alternative, the lenses may be individually associated with the pixels on a single layer.

FIG. 4 also shows a backlight layer 415. This illustrates that the embodiments are usable with either passive technology or with emissive technology.

The lenses may be used to make each pixel look closer or further. This enhances the D-D effect. The zoomed pixels may also be controlled one relative to the other in order to obtain an electrically controlled hologram.

The different embodiments can be made in different ways. While the above describes using a thin layer of plastic, the polymer forming the layer may actually be thicker. For example, the polymer may be anywhere between 0.005 mm to any thickness, e.g., 1 mm. While the embodiment shows forming this on polymer, alternatives can use doped and deposited materials.

Figure 5:
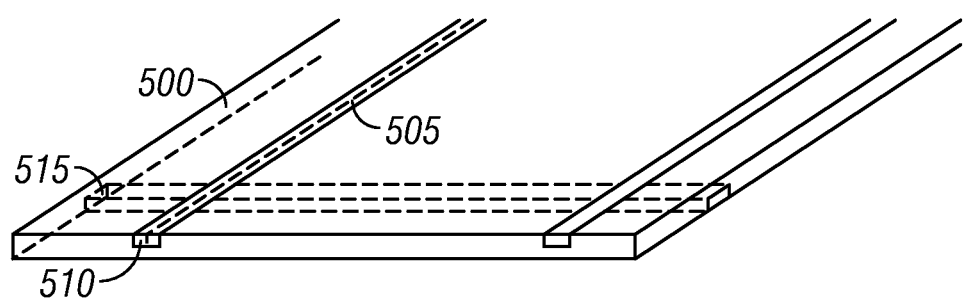
FIG. 5 shows an embodiment where electrodes are formed on different surfaces.
Figure 6:
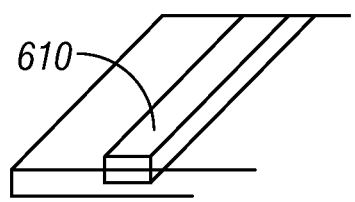
FIG. 6 shows a deposited layers.

FIG. 5 illustrates how electrodes can be also formed on the substrate. In FIG. 5, substrate 500 is a transparent substrate. Electrodes 505 and 515 can be formed in multiple different directions for example orthogonally. In one embodiment, for example, the electrodes can be formed of indium tin oxide or ITO. Another embodiment may use a doped area that is built to become conductive. FIG. 6 shows a deposited electrode 610, while FIG. 5 shows an electrode that is formed as part of the substrate itself by doping the substrate or otherwise changing the substrate in order to make it conductive.

In the embodiments, the electrode may also extend to the edge of the material on one of the edges of the material, shown as 510. In the embodiment of FIG. 5 where the substrate is changed, there is actually an area of the substrate that becomes electrically conducting and therefore that itself extends around the edge. Contact can then be made with that edge portion 510. The orthogonal electrodes such as 515 can then be on the lower surface so that they do not contact the upper electrodes.

Figure 7:
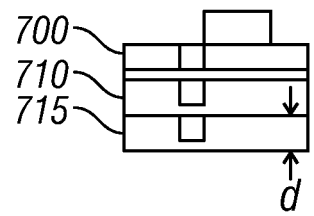
FIG. 7 shows multiple different layers on different lines.

FIG. 7 illustrates how the different materials can be stacked one on top of the other, to form multiple different layers 700, 710, 715. In this embodiment, the layers are stacked directly one on top of the other.

Figure 8:
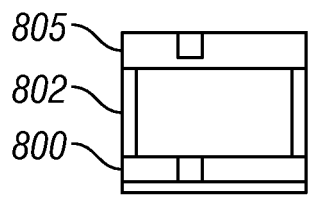
FIG. 8 shows spaces between the different layers.

In the FIG. 8 embodiment, however, there is a first layer 800, spacing structure 802 that makes the space between the first layer and a second layer 805. The spacing structure 802 can be fixed, or in an embodiment can be electrically movable, to change a distance between the layers. For example, each pixel or neighborhood of pixels may have a piezoelectric material that changes size when electrically actuated.

Figure 9:
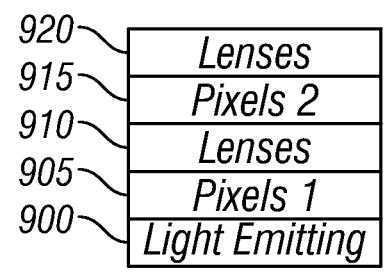
FIG. 9 shows an embodiment where lenses and pixels are all formed as a stack.

FIG. 9 illustrates a final stacked structure according to one embodiment where there is a light emitting layer 900, stacked with a first set of pixels 905, a first set of micro-lenses 910 a second set of pixels 915 and a second set of micro-lenses 920. There is no limit on the amount of stacking that can be used, and for example 100 layers could be stacked in this way.

One problem with devices of this type, especially emissive devices, is that the different colored emission elements may have different lifetimes. For example, the blue OLeds may degrade faster than the red and green Oleds element. Another embodiment may include compensation for screen degradation for both OLeds, and for any other device where the elements can degrade. According to one embodiment, there may be multiple pixel sets which may be used to compensate for degradation in another pixel set.

In this embodiment, which may use the structure of FIG. 1, pixel set one and pixel set 2 are entirely or partly pixel sets that are used for compensating for screen burn in. For example, the neighborhood 150 in pixel set 1 may have a corresponding neighborhood 151 in pixel set 2. If this neighborhood includes red green blue pixels, then the neighborhood in the second pixel set may be the same set of colors. The pixel set one may be used exclusively until degradation is determined. At that point, parts of pixel set 2 may be used. This may double the lifetime of the device.

According to another embodiment, both pixel sets 1 and pixel set 2 may be used simultaneously, however at each at half brightness. This may have the effect of more than doubling the lifetime, since the lifetime may decrease exponentially according to the brightness output. Operating these devices at a much lower percentage output may substantially increase their lifetime.

Another embodiment may couple a photodetector with the pixel sets, where each of the neighborhoods may include an associated photodetector. For example, the neighborhood 150 may include a photodetector 155. These photodetectors may be located throughout the entire pixel set, or alternatively may be located in only selected pixel sets, and operate on the assumption that all pixel sets will age in a substantially similar way.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, While FIG. 9 and other shows a light emitting embodiment, it should also be understood that this embodiment could be used with transmissive layers.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be used for the electronics, and that may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A video screen device, comprising:
    a first array of elements forming pixels of a video screen, said first array occupying a first plane;
    a second array of pixels, occupying a different plane than said first plane, and located such that pixels of said first array overlap in planar location with pixels of said second array;
    a controller which controls operating said pixels of said first array and said pixels of said second array; and
    lenses which are individually controllable to change a 3-D effect by controlling a first pixel of one of said arrays to appear farther away than a second pixel of another of said arrays,
    where the controller moves at least one of the lenses to change the 3D effect, during use of the video screen device.

2. A video screen device as in claim 1, wherein said controller operates said first array and said second array to form a 3-D effect by changing where a pixel appears to be located between said first array and said second array.

3. A video screen as in claim 1, wherein there is a third array of pixels, occupying a different plane than either of said first or second array of pixels.

4. A video screen as in claim 1, wherein said lenses are individually controllable to different layers of zoom.

5. A video screen device, comprising:
    a first array of elements forming pixels of a video screen, said first array occupying a first plane;
    a second array of pixels, occupying a different plane than said first plane, and located such that pixels of said first array overlap in planar location with pixels of said second array;
    a controller which controls operating said pixels of said first array and said pixels of said second array; and
    a spacing device between said first array and said second array, wherein said spacing device is controllable to provide different amounts of spacing at different areas of said arrays, and said spacing device is controlled by said controller to change the spacing during use of the video screen device.

6. A video screen as in claim 5, wherein said arrays are formed on plastic transparent and flexible substrates.

* * * * *